Figure 1:
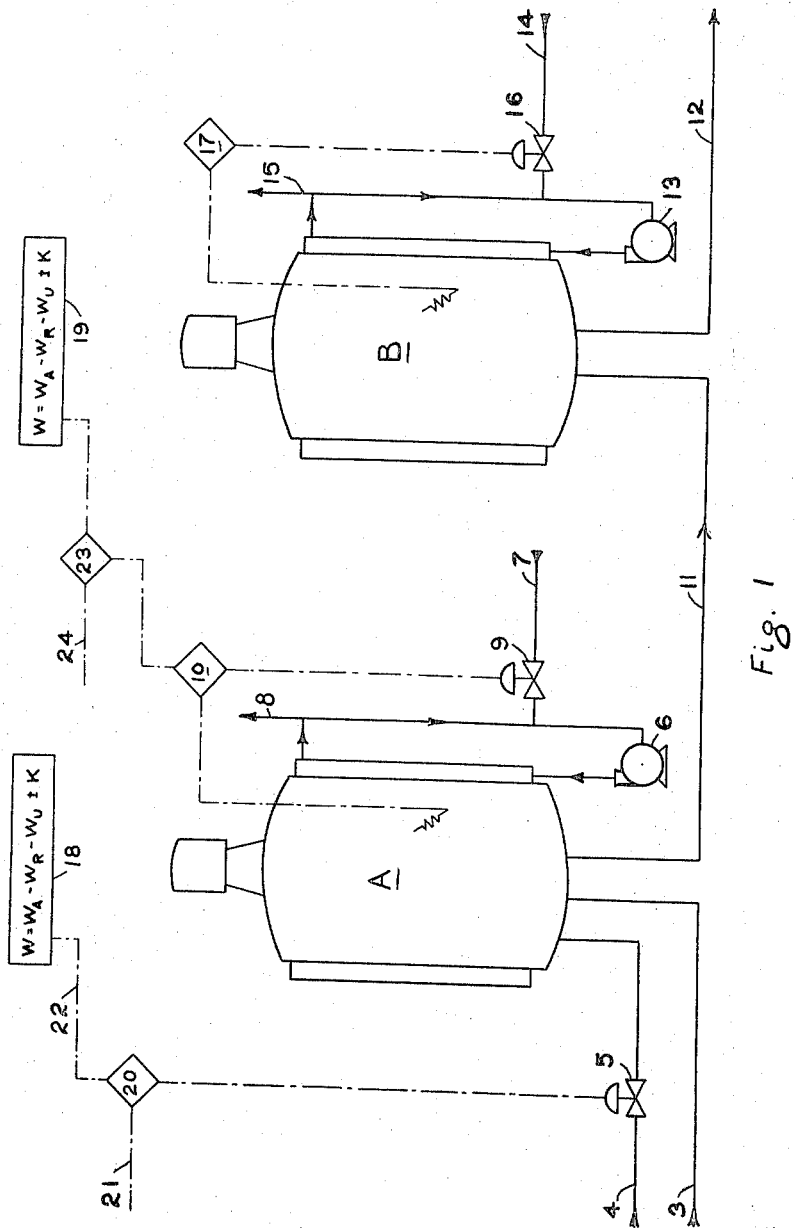

INVENTORS
Hermann Amrehn
Günther Beckmann
Paul Bernemann
Wilhelm Schänzer
By Pierce, Scheffler & Parker attys INVENTORS
Hermann Amrehn
Günther Beckmann
Paul Bernemann
Wilhelm Schänzer
By Pierce, Schiffler & Parker attys United States Patent Office 3,351,430
Patented Nov. 7, 1967

3,351,430
METHOD FOR THE AUTOMATIC CONTROL OF REACTIONS IN CONTINUOUS FLOW REACTION SERIES
Hermann Amrehn and Günther Beckmann, Marl, Paul Bernemann, Haltern, and Wilhelm Schänzer, Marl, Germany, assignors to Chemische Werke Hüls Aktiengesellschaft, Marl, Germany, a corporation of Germany
Filed Apr. 30, 1964, Ser. No. 363,807
Claims priority, application Germany, Sept. 20, 1963, C 30,937
1 Claim. (Cl. 23—230)

Exothermic reactions which occur in agitating autoclaves which are arranged in series with continuous flow-through of the material, with the heat of reaction being eliminated by cooling of the autoclaves, should develop in such a uniform manner that the conversions in the individual autoclaves do not fluctuate with respect to time.

If the conversion distribution is kept constant with respect to time it will result in advantages as to economy of the process, the magnitude of yield and the quality of the product.

It is difficult to attain the desired uniformity in case of reactions where the speed of the reaction increases with the temperature and the thermal dissipation becomes more difficult to accomplish with increased inversion, for example if the viscosity of the mass in the autoclave increases also. In such instances there exists an unstable equilibrium between the generated heat and the dissipated heat. The smallest fluctuations in the quantity, concentration and activity of the catalyzer—usually introduced at the first autoclave of the series—or deviations from the desired value of components actuating the reaction will lead to extensive and dangerous fluctuations in temperature and reaction, especially in the first autoclaves of the series where fluctuating activation will take effect most rapidly and intensively.

It has been necessary heretofore, in order to carry out such reactions at all, to design the cooling capacities of the autoclaves in such manner that their maximum heat dissipation capabilities are substantially above the magnitude of the average heat generated to prevent a so-called "burn-through" of the series in case of a sudden increase in the reaction and, as a result thereof, an excess of reaction heat.

An increase of the cooling capacity of the autoclaves above average requirements is costly and also disadvantageous in other respects, especially in case of reactions where material will bake and stick to the walls. For example, the installation of cooling pipes or coils in order to increase the cooling capacity will impede the uniform flow through all areas of the autoclave and also hinder removal of the baked-on material when the equipment is cleaned.

It is known to employ automatic temperature controls for the dissipation of heat. In this manner the autoclave is supplied with an appropriate quantity of cooling agent which will keep the temperature constantly at a desired value.

However, this control will function properly only if the cooling capacity is ample. This control cannot prevent the occurrence of fluctuations in conversion rate caused, for example, by non-uniform activation.

A method heretofore frequently employed, namely to regulate from time to time the activation of the reaction on the basis of tests made of the reaction such as analyses of the percentages of solids, is not a satisfactory solution first, because the test results are obtained belatedly, at time intervals only and are unreliable due to shortcomings in analytical methods, and secondly because a specimen taken from the autoclave will not permit the drawing of a conclusion as to the speed of reaction at the moment of the removal of the specimen. The analysis will reveal only the mean total transformation over a substantial period of time due to the staying-time of the liquid particles in the autoclave. This method will not reveal a transitory but great fluctuation in the speed of reaction.

The state of art was advanced a few years ago with the employment of continuously operating tests by analyzing the reaction mixture while it is being processed, by means of densimeters, viscosimeters and the like. These tests serve to supply values of the reaction quickly and continuously but again these measurements indicate solely the mean total conversion. Another disadvantage of such tests is the fact that the devices, especially in case of polymerizing media, are subject to baked on deposits and will therefore furnish incorrect data when the process has been in operation for some time.

It is also known to employ large-sized digital computers in order to keep the reaction distribution within a series of autoclaves constant with respect to the time factor and to obtain optimum results from the process. These large-scale computer sets calculate the most favorable process requirements based on data such as quantities, temperatures and purities of the materials employed, activity of the catalyzers, operating conditions of the series of autoclaves and the like and insure the maintenance of the conditions so computed with the aid of controlling devices.

The employment of such computers requires however a full knowledge of the process expressed in the form of mathematical equations, and this mathematical representation of the process must contain and make allowance for any possible sources of disturbance. It is obvious that the preparation of such mathematical representation, if at all possible, will be difficult and time-consuming. Any newly arising source of disturbance requires readjustment of the simulated process.

Therefore, a very definite need exists from an industrial point of view for the development of a method which will insure a precise control of the reaction speed, the desired reaction and corresponding reaction temperature at least within the first two autoclaves of a series and having a continuous flow-through while at the same time the cooling capacity of the autoclaves is held to a minimum. The apparatus employed for this purpose must detect the instantaneous value of the reaction within an autoclave, must operate without being subject to baked on deposits within the autoclaves, must eliminate automatically fluctuations in the activity of catalyzers or of the components activating the reaction, correct for impurities of the starting materials which may influence the reaction adversely, and insure maximum utilization of the individual autoclaves.

In this connection a definite criterion for the instantaneous value of a reaction, for example a polymerization, in an autoclave is the heat generated by the exothermic process. The reaction heat generated is dissipated by means of a cooling agent. If the inflowing quantity of the cooling agent is designated by the letter Q, the difference in temperature by $T_2-T_1$, $T_2$ representing the temperature of the cooling agent leaving the cooling apparatus of the autoclave, and $T_1$ representing the temperature of the inflowing cooling agent, the quantity of dissipated heat $W_A$ can be determined by the equation $W_A = Q(T_2-T_1)$.

Obviously, the dissipated heat $W_A$ contains, in addition to the reaction heat W proper also the quantities of heat which are introduced to the autoclave by other sources such as agitators, pumps and starting materials. Therefore, the true reaction heat W is represented by the formula $$W = W_A - W_R - W_U \pm W_E$$

where $W_R$ and $W_U$ represent quantities of heat generated by the agitator and the pump circulating the cooling agent, and $W_E$ the amounts of heat introduced to the autoclave by the materials entering the autoclave.

$W_R$ and $W_U$ can be determined easily on the basis of the input loads of the drive motors, and $W_E$ can be reduced to a constant if the starting materials flow into the autoclave at constant temperature and wihout or with only very slight changes in quantity.

$W_A$ is determined by one flow rate and two temperature measurements. W can be determined with an accuracy of ±1.5% by use of a small pneumatic or electronic analogue computer which is available on the market. The reaction heat W is at any given time a definite criterion of the reaction within the autoclave.

The conversion rate of an exothermic reaction becomes greater per time unit with increasing reaction temperature and/or increasing addition of catalyzer. If, within a series of autoclaves, a specific utlimate conversion is to be attained in the last autoclave, it is possible, if the passage of heat in each autoclave is equally effective, that is in case of constant heat transfer properties of the material under process, to produce in each autoclave a uniform conversion whereby the sum of the single conversions represents the total conversion; if the passage of heat becomes poorer in each subsequent autoclave, for example due to an increase in viscosity, an increase in foaming and the like, that is in case of variable heat transfer properties of the material under process, it is possible to produce in the first autoclave the greatest single conversion and in each subsequent autoclave a gradually diminishing single conversion. The sum of the unlike single conversions again represents the total conversion.

In many instances it will be most economical to introduce the catalyzer needed for the entire reaction, or the substances activating the reaction at the first autoclave exclusively. In order to maintain the single conversions of each autoclave within the series it will be necessary to determine the appropriate reaction temperatures. The reaction temperature of the first autoclave must be kept relatively low because a certain partial conversion is only to be accomplished therein even though the quantity of catalyzer introduced is sufficient for the process as a whole. It will be obvious that the reaction temperature to be maintained therein is critical. If the temperature is out of control and rises, for example due to the composition of the reaction products, it will lead to a very pronounced increase in reaction, possibly causing a "burn-through" in the first autoclave. If the reaction temperature decreases due to disturbances the "burn-through" might occur in one of the subsequent autoclaves.

It is also important to limit the quantity of catalyzer introduced into the first autoclave to the actual amount required for the reaction as a whole. In this connection allowance must be made for the fact that an increase in the amount of catalyzer will become necessary in certain instances, for example if traces of inhibitors are present, without any other changes in the composition of the starting material.

The controls outlined above will permit a fully effective method for the automatic control of the conversion distribution in reactors operating in series and having a continuous flow-through, with a pneumatic or electronic analogue computer determining the instantaneous value of the conversion rate within each autoclave on the basis of the reaction heat dissipated, feeding the relevant reaction heat measurement to a control element, the control element being programmed to maintain the heat-quantity as computed for the conversion rate desired, and regulating the supply of catalyzer and/or cooling agent.

The new method, based on the heat-balance measuring system, known per se, uses standard pneumatic and/or electronic control devices by combining the control systems in a specific manner and attains a result which heretofore could be accomplished only by use of large-size computer systems. It insures the automatic computation and maintenance of the required reaction temperature in each autoclave in the manner appropriate for the required single conversion stage as well as the automatic introduction of the catalyzer in the amount required for the reaction as a whole. The method and the apparatus is explained below and shown in simple form by the accompanying drawings in which FIG. 1 is a diagrammatic representation of two of a series of autoclaves and FIG. 2 is a curve representing the reaction in the different autoclaves.

Figure 2:
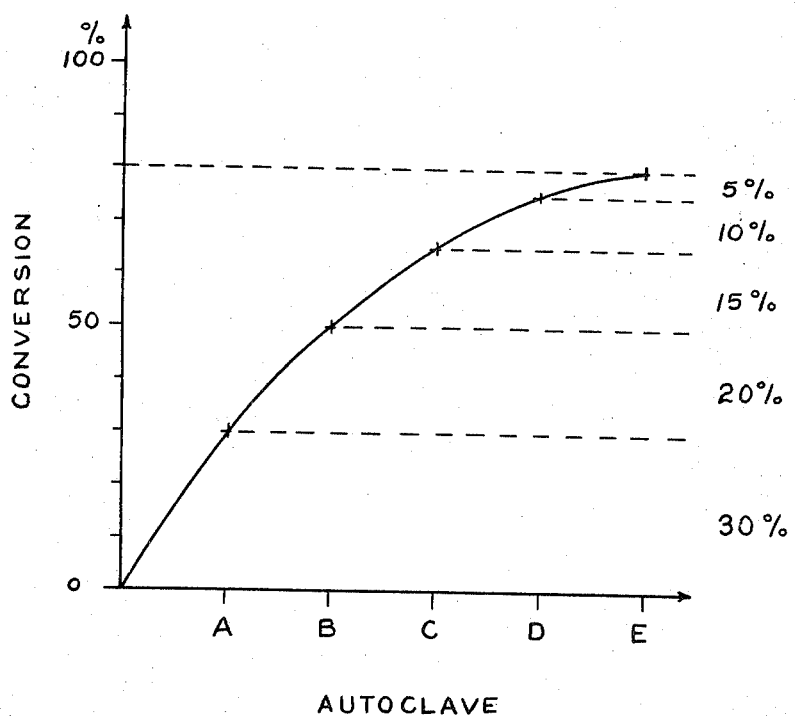

Referring to FIG. 1 it is assumed that a polymerization process is to be carried out in two autoclaves A and B to an ultimate conversion of 80%. A conversion of 40% is to be attained in each autoclave. The substances to be polymerized, the solvents as well as any other additives flow into the autoclave A through the pipe 3. The catalyzer is introduced through pipe 4, its quantity being subject to control by the regulating valve 5. Pump 6 circulates the cooling agent through the cooling system of the autoclave A. New cooling agent flows in through pipe 7 and the heated cooling agent is removed through pipe 8. The regulating valve 9, located in the inflow pipe 7 controls the flow of the cooling agent in such manner that the desired temperature is maintained in the reactor A by a temperature controller 10 which is set to this temperature. The compound being polymerized is conveyed from autoclave A to autoclave B through pipe 11, and leaves autoclave B through pipe 12. Autoclave B is provided with a circulating cooling system identical with the system of autoclave A, with a pump 13, cooling agent inlet pipe 14, outflow pipe 15, control valve 16 and temperature regulator 17.

Autoclave A and autoclave B are equipped with pneumatic or electronic analogue computers 18 and 19 respectively which will compute, in the manner described above, the reaction heat W. The heat-quantity controller 20 of the autoclave A is supplied by means of a pneumatic or electric impulse 21 with the desired value which is the computed heat amount value for the 40% conversion of the inflowing polymerizable substances. The computer 18 transmits in form of a pneumatic or electric signal the value of the computed dissipated reaction heat as actual value 22 to the conroller 20. Taking into consideration the reaction temperature within the measured zone, maintained by the temperature controller 10, the heat-quantity controller 20 will adjust through the control valve 5 the inflow of the catalyzer in such manner that a 40% transformation is attained in the autoclave A.

This first step fulfills the requirement that in the autoclave A the desired 40% conversion be accomplished. Not yet satisfied is the requirement that a sufficient amount of non-used catalyzer will leave the autoclave A so that autoclave B also will attain the desired 40% conversion. For the purpose of accomplishing this aim the heat-quantity controller 23 of the autoclave B is programmed with the theoretical value 24 which represents the value for a 40% conversion. The reaction heat of the autoclave B, calculated with the aid of the analogue computer 19, is fed into the controller 23. With the aid of the temperature controller 17 there is then maintained in the autoclave B a reaction temperature in accordance with the measurements.

The heat-quantity controller 23 will change continuously by means of a pneumatic or electrical signal the theoretical value of the temperature controller 10 until the heat-quantity values, the desired as well as the actual value, coincide.

If the quantity of heat dissipated in the autoclave B is smaller than the desired value, the autoclave B lacks a sufficient quantity of non-used catalyzer. If such condition arises the heat-quantity controller 23 will readjust continuously the desired temperature value of the temperature controller 10 of the autoclave A toward lower temperatures and the temperature controller 10 will lower automatically the reaction temperature within autoclave A. A lower reaction temperature in the autoclave A causes a reduction in conversion and consequently a reduction in the quantity of dissipated heat. Since the actual amount of dissipated heat falls below the desired value as programmed in the heat-quantity controller 20, this controller will cause the control valve 5, located in the catalyzer inflow pipe 4, to open continuously until the conversion in the autoclave again reaches the desired percentage.

Since the heat-quantity controller 23 of the autoclave B changes continuously the reaction temperature of the autoclave A until the conversion within the autoclave B reaches its desired value, and on the other hand the heat-quantity controller 18 of the autoclave A changes continuously the rate of catalyzer supply in such manner that the desired conversion is maintained within the autoclave A, the proposed method will insure that the single conversions within the two autoclaves are maintained at the desired rate of conversion so that the total conversion is kept precisely at the proper value; the reaction temperature of the autoclave A is kept automatically at such value that a sufficient amount of catalyzer will reach the autoclave B; influences disturbing the conversion, for example caused by inhibitors present in the starting materials, can be eliminated immediately by changing the amount of catalyzer inflow without adverse effect on the autoclave B.

Two methods can be employed to determine the reaction temperature in the autoclave B. If the end product permits it, the temperature can be set so high that the catalyzer is utilized completely in the autoclave B. The temperature can be selected also in such manner that the product leaving the autoclave B still contains a specific amount of active catalyzer. The quantity of active catalyzer present in the end product is then determined analytically or by simple reaction tests and the appropriate reaction temperature, corresponding to the desired quantity of active catalyzer, is transmitted to the temperature controller 17 either manually or automatically.

If it is desired to vary the quantities of the polymerizable compounds, introduced into the autoclave A by way of pipe 3, the desired values 21 and 24 of the heat-quantity controllers 20 and 23 likewise can be set either manually or automatically to conform with the proper quantities of reaction heat.

The automatic setting is accomplished by measuring the quantities of the reacting substances, multiplying in a pneumatic or electronic multiplier by the reaction heat per unit of weight of the reacting substances, and putting the result into the heat-quantity controllers as the desired values 21 and 24.

It is obvious that the method described in the above given example can be readily expanded and applied to more than two reactors. Essential is the point that the dissipated reaction heat of the subsequent autoclave is the determining factor for the reaction temperature of the preceding autoclave, and that the reaction heat of the first autoclave controls the catalyzer inflow.

The method is not limited to an arrangement where the entire catalyzer is introduced into the first autoclave. Certain process techniques may require the introduction of an additional amount of catalyzer into other than the first autoclave within the series of autoclaves, for example if a specific reaction temperature of the first or any subsequent autoclave must not fall below, or go beyond a certain value. The heat-quantity regulator of the autoclave following the autoclave with reaction-temperature limitation will introduce continuously, in known manner, additional catalyzer into the autoclave as soon as the temperature approaches the cut-off value. The equipment required for this operation and the method are known.

Contrary to expectations it was found that in case of a series of a large number of autoclaves the above described method need not be applied to all autoclaves of the series. In most instances it will suffice to employ the method in connection with the first two or three autoclaves and to equip the other autoclaves solely with a temperature control. This becomes possible because the method will rectify immediately any adverse situation influencing the reaction process within the first autoclave so that the subsequent autoclaves will not be affected thereby; the reaction within the autoclaves operating on the basis of the proposed method is stable; the selection of the reaction temperature at which the last autoclave, controlled by this method, is operating will provide, with a high degree of reliability, the quantity of active catalyzer required by all subsequent autoclaves.

This technique is demonstrated below by use of a practical example, namely the polymerization of butadiene. The polymerizable starting material to be processed within a series of 5 autoclaves, consists of butadiene-1,3 dissolved in benzene. The catalyzers are so-called "Ziegler-catalyzers," i.e. reaction products of aluminum-organic compounds with titanium or other metal compounds, in the specific example used for this demonstration: diethylaluminummonochloride and cobalt salts dissolved in benzene. Since the aluminum component is very reactive, and reacts with impurities of the solution, for example compounds with displaceable hydrogen (water, alcohols, acids and the like) and oxygen, and thereupon becomes inactive, there is usually added an excess of this component together with the main flow of a mixture which is made up of the benzene, the butadiene, the aluminum component of the catalyzer as well as the so-called regulating agent to attain a certain molecular weight. These regulating agents such as acrylonitrile, allene, methylallene which are compounds with multiple linkages are known. The cobalt salt, dissolved in benzene, is introduced into the autoclaves separately and serves as starter for the reaction.

With progressing conversion the viscosity of the medium under process will increase sharply and the heat dissipation by means of the cooling devices will become poorer. Therefore, if the reactor series is to operate at maximum efficiency and still economically with respect to the cooling capacities of the individual reactors, and guaranteeing a suitable end product, the introduction into the first autoclave of the series of the cobalt-salt catalyzer, dissolved in benzene, in a quantity sufficient for the reaction as a whole will require a certain percentage of conversion for each reactor of the series and the appropriate curve resulting therefrom is illustrated in FIGURE 2.

In FIGURE 2 the required conversion within each autoclave is plotted with a total conversion of 80% to be attained in the fifth autoclave. At the right side of the graph there are shown the single conversion for each autoclave. The conversion is 30% for the first autoclave and decreases gradually to 5% for the fifth autoclave.

Only the first two autoclaves of the five autoclaves are operated in accordance with the method and by use of the apparatus of the present invention. If the required theoretical conversion values for these first two autoclaves are maintained and kept stable, the other portion of the conversion characteristic will be attained without any difficulties provided the autoclaves C, D and E are equipped with well functioning temperature controls. The reaction temperature of the autoclave B generated by the process therein is initially determined and set, as described above, in such manner that a sufficient amount of active catalyzer will enter the subsequent autoclaves to insure the remaining 30% of conversion.

The technical devices and the apparatus used for autoclaves A and B are identical with the arrangement shown by FIGURE 1, and the polymerizing substance, upon leaving the autoclave B, will flow through pipe 12 into the autoclave C and from there through appropriate pipes into autoclaves D and E. The autoclaves C, D and E are equipped with a cooling cycle including temperature controller and control valve which is identical with the cooling system shown for autoclave B.

Through the pipe 3 (see FIGURE 1) the butadiene dissolved in benzene, the aluminum-organic compound and the regulating agent (butadiene-1,2) flow into autoclave A at constant temperatures and in a total quantity of 10 m.$^3$ per hour. The benzene cobalt-salt solution is introduced separately into the autoclave A by way of pipe 4. During normal operations the autoclaves are filled to capacity, each autoclave having a volume of 15 m.$^3$. A pneumatic analogue computer 18 computes the reaction heat generated in the autoclave A based in the equations $$W = W_A - W_R - W_U + W_E, \quad W_E = \text{constant}$$

$$W_A = Q \cdot (T_2 - T_1)$$

The pneumatic heat-quantity controller 20 with proportional and reset action insures as described above the maintenance of a constant 30% conversion within the first autoclave. Any change in the inflow of catalyzer will have a measurable effect in the autoclave A within 5 to 6 minutes.

A pneumatic analogue computer 19 computes, as described above, the reaction heat generated in autoclave B and adjusts with the aid of the heat-quantity controller 23 with proportional and reset action the desired temperature of temperature controller 10 of the autoclave A in such manner that the desired conversion within autoclave B is maintained. Follow-up time of the heat-quantity controller 23 is 2 hours.

Obviously, the method proposed could be extended and applied to all five autoclaves but the stable conditions of the conversion within autoclaves A and B, attained by the method proposed make such step unnecessary.

We claim:

Method for the automatic control of the conversion distribution in a series of autoclaves having a continuous flow-through of reactants in an exothermic process wherein reaction heat is removed by a coolant passed in heat exchange relationship with the contents of said autoclaves and reaction heat W from each autoclave is measured by a known computer, according to the equation $$W = W_A - W_R - W_U \pm W_E$$

wherein $W_A$ is the dissipated heat, $W_R$ and $W_U$ are quantities of heat generated by the agitator and the pump circulating the cooling agent and $W_E$ is the heat introduced by the materials entering and leaving the autoclave, and wherein the output signal of said computer which is directly proportional to the actual reaction heat W is fed as measurement signal into a controller of standard design, this controller being preset to the wanted rate of conversion for each autoclave by a set point signal which is proportional to the desired value of reaction heat and wherein the output signal of the controller of the first autoclave is connected to the valve in the catalyst flow and thus controls the flow of the catalyst into the first autoclave, wherein the output signal of the controller of the second autoclave is fed as a set point signal into the temperature controller of the first autoclave thus controlling the reaction temperature inside the first autoclave, wherein the output signal of the controller of each downstream autoclave is fed as set point signal into the temperature controller of the next upstream autoclave, and wherein the set point of the temperature controller of the last autoclave of the line which is equipped with said computer is set manually to such a reaction temperature that if this autoclave is the last autoclave of the line the set reaction temperature guarantees that all active catalyst is spent for the reaction in the last autoclave and if this autoclave is not the last autoclave of the line, the set reaction temperature guarantees that the active catalyst leaving this autoclave is sufficient for the final reaction, the value of this reaction temperature being evaluated by laboratory tests in which the reaction temperature is changed until an amount of catalyst leaves the autoclave that is sufficient for the signal reaction, said reaction heat controllers of downstream autoclaves automatically adjusting the set points of the temperature controllers of the corresponding upstream autoclaves in such a way that each autoclave receives that amount of catalyst which is necessary to guarantee the conversion in itself and the autoclaves downstream in the line and the reaction heat controller of the first autoclave controlling the flow of the catalyst into the first autoclave to an amount sufficient for the total conversion of the line, said method being used to control the conversion distribution of at least the first two autoclaves of the line.

References Cited

UNITED STATES PATENTS 3,220,993   11/1965   Berger _____ 260—698 X

MORRIS O. WOLK, *Primary Examiner.*

JOSEPH SCOVRONEK, *Examiner.*

H. A. BIRENBAUM, *Assistant Examiner.*